Patented July 5, 1949

2,474,863

UNITED STATES PATENT OFFICE 2,474,863

SOLDERING FLUX

William H. Rinkenbach, Dover, and Arthur J. Clear, Stanhope, N. J.

No Drawing. Original application June 22, 1945, Serial No. 601,053. Divided and this application January 10, 1949, Serial No. 70,134

3 Claims. (Cl. 148—25)

(Granted under the act of March 3, 1883, as amended April 30, 1928; 370 O. G. 757)

The invention described herein may be manufactured and used by or for the Government for governmental purposes without the payment to us of any royalty thereon.

This invention relates to soldering fluxes.

More particularly the present invention relates to soldering fluxes of the so-called "non-acid" type which are useful in soldering various metals with solders consisting of alloys of lead and tin.

The present application is a division of our copending application Serial No. 601,053, filed June 22, 1945, now U. S. Patent No. 2,471,451.

Fluxes which are used in soldering with lead-tin alloys are generally considered as belonging to either of two groups, namely to the group of the so-called "acid" fluxes or to the group of the so-called "non-acid" fluxes. The "acid" fluxes as usually prepared contain a water soluble inorganic chloride, usually in the form of an aqueous solution. Generally this inorganic chloride is ammonium chloride or zinc chloride. Some acid fluxes, heretofore known and used, contain both ammonium chloride and zinc chloride. Other water soluble inorganic chlorides have been associated with ammonium chloride or zinc chloride, or with both of them, in fluxes for soldering with lead-tin alloys. Except in some unusual cases, the "acid" fluxes do not contain any acids, but since the inorganic salts included in them are usually composed of a weak base metal or an inorganic radical, such as zinc and ammonium, and a strong acid, such as hydrochloric acid, the aqueous solutions of the salts are slightly acid owing to hydrolysis.

In this written description, an "acid" flux means a flux which contains either a free mineral acid, such as hydrochloric acid, or an inorganic salt which hydrolyzes in water to give an acid reaction. The acid fluxes are corrosive with respect to the soldered metal in that their acidity may attack or react with the metal either during the soldering operation, or after the soldering operation if they are not effectively removed from the soldered parts by suitable wiping or washing operations. It is usually difficult to remove completely the residues of an acid flux from the soldered parts after they have been soldered. These residues, if not removed promote or cause corrosion or rusting of the metal or metals soldered.

While acid fluxes usually work well in soldering metals with lead-tin alloy solders, they possess disadvantages or objections. Among these may be mentioned: (1) they are highly corrosive, and therefore their use is limited to applications where corrosion is not an important factor; (2) the residues of the fluxes, after the soldering operation, usually have a high electrical conductivity, and as a consequence such fluxes are not suitable in electrical assemblies; (3) the corrosive and electrical conducting properties of the residues of the fluxes are usually augmented by the hygroscopic nature of the residues; and (4) the physical nature of the flux residues usually is such that the residues are not readily or easily removed by washing with water.

It is an object of the present invention to provide fluxes for soldering various metals with lead-tin alloys which do not possess the objectionable corrosive properties and other above mentioned objectionable properties of the acid fluxes.

The fluxes according to the present invention may be characterized according to present nomenclature, as belonging to the class of "non-acid" or "non-corrosive fluxes, because they do not contain any mineral acid or any water soluble inorganic salts of mineral acids. In this description and in the appended claims, a "non-acid" or a "non-corrosive" flux, means a flux which does not contain, or which is substantially free of, mineral acids, water soluble inorganic salts of mineral acids and appreciably water soluble organic acids or any other chemical compound which causes corrosion of metals. This definition, it is to be noted, does not exclude the presence in the flux of water insoluble, or substantially water insoluble, organic acids such as stearic acid, which is insoluble in water, and benzoic acid which is not appreciably or substantially soluble in water, being soluble to the extent merely of 0.29 gram in 100 cc. of water at 20° C. With this in mind, the term "non-corrosive" flux is adopted herein; although according to present nomenclature a flux containing rosin (a mixture of abietic acid and anhydride) or other water insoluble organic acid, without ammonium chloride and zinc chloride or other hydrolyzing inorganic salt, would be referred to as a "non-acid" flux, despite that it does contain an organic acid, namely abietic acid and its anhydride.

We have discovered that non-corrosive fluxes of highly advantageous or desirable characteristics for use in soldering metals with lead-tin alloy solders can be prepared by compounding rosin, stearic acid and petroleum jelly, with or without benzoic acid, in proportions lying within more or less narrow limits.

The following illustrative examples disclose the ingredients of fluxes according to the invention, their proportions and ranges of proportions, the manner of compounding the ingredients into the

Example I

The ingredients and their proportions according to this example are: 50 parts by weight of rosin, 15 parts by weight of stearic acid and 35 parts by weight of petroleum jelly (for example, Vaseline), preferably white petroleum jelly. All of the ingredients are placed together in a container or kettle, mixed and heated, at a temperature not exceeding 115° C., until solution of the rosin and stearic acid in the molten petroleum jelly has taken place completely. During the heating, the ingredients are stirred to assist solution of the stearic acid and rosin, and to bring about uniformity of distribution of the rosin and stearic acid in the molten petroleum jelly. After the above described heating operation has been performed, the product is allowed to cool to room temperature. The cooled product is the finished flux according to this example.

The finished flux of this example at room temperature is a soft paste of a white to yellowish white color. It can be used very effectively in soldering tin, tin-plate, and copper with lead-tin alloy solders. The flux works very well with a lead-tin alloy solder consisting of 50% lead and 50% tin. The flux is easily applied with a brush and the solder flows well when it is used. The flux does not cause corrosion of the soldered metal after soldering, even though its residue after soldering is not removed. Further, its residues after soldering can be readily and effectively removed by wiping with a cloth wet with ethyl alcohol or trichlorethylene.

While the above given proportions of ingredients give good results and are the preferred ones at present the proportions may be varied within the limits shown in the following table:

| | Parts by weight |
|---|---|
| Rosin | 48 to 52 |
| Stearic acid | 14 to 16 |
| Petroleum jelly | 33 to 37 |

Example II

The ingredients and their proportions according to this example are: 30 parts by weight of rosin, 20 parts by weight of stearic acid, 10 parts by weight of benzoic acid and 40 parts by weight of petroleum jelly. All of the ingredients, except the benzoic acid are placed in a container or kettle and heated to a temperature not exceeding 115° C. The ingredients are stirred during the heating and the heating is continued until the rosin and stearic acid have dissolved completely in the molten petroleum jelly. After this, the heating is discontinued and then the benzoic acid is added to the still hot and liquid product in the kettle, and the so formed mixture stirred until the added benzoic acid has dissolved. The resulting liquid product is then allowed to cool to room temperature and constitutes the finished flux. At room temperature it is a soft paste of a white to yellowish white color. It can be very effectively used in soldering tin, tin plate, copper, brass, zinc, galvanized iron, and terneplate with lead-tin alloy solders. The flux works well with a soft solder consisting of an alloy of 50% lead and 50% tin. The flux prepared according to this example has all the advantageous characteristics or properties of the flux prepared according to Example I, except that in soldering brass, copper and zinc very slight corrosion of these metals will be caused by the residues of the flux if they are not wiped off, for example, with ethyl alcohol or trichlorethylene. Tin, tin plate, and terneplate are not corroded by the flux prepared according to this example even though the flux residues after soldering are not removed.

While the proportions of ingredients given above in this example give good results in use and are the proportions preferred at present, they may be varied within the limits shown in the following table:

| | Parts by weight |
|---|---|
| Rosin | 28 to 32 |
| Stearic acid | 18 to 22 |
| Benzoic acid | 9 to 11 |
| Petroleum jelly | 38 to 42 |

The fluxes prepared according to this example, as well as those prepared according to Example I, are of the consistency of a salve or soft paste. The rosin, stearic acid and benzoic acid are intimately mixed in and uniformly distributed in the petroleum jelly.

The fluxes prepared according to the two examples given above are and should be substantially free of chemical compounds which cause substantial corrosion of the metals to be soldered. The flux prepared according to Example I above should be kept free of ingredients or materials which materially alter the action of the rosin, stearic acid and petroleum jelly in the flux when it is used in soldering; and similarly, the flux prepared according to Example II should be kept free of ingredients or materials which materially alter the action of the rosin, stearic acid, benzoic acid and petroleum jelly in the flux when it is used in soldering.

We claim:

1. A soldering flux comprising about 28 to 32 parts by weight of rosin, about 18 to 22 parts by weight of stearic acid, about 9 to 11 parts by weight of benzoic acid, and about 38 to 42 parts by weight of petroleum jelly, the flux being substantially free of chemical compounds which cause substantial corrosion of the metals to be soldered and substantially free of materials which materially alter the action of the rosin, stearic acid, benzoic acid and petroleum jelly in the flux when it is used in soldering.

2. A soldering flux consisting essentially of 28 to 32 parts of rosin, 18 to 22 parts of stearic acid, 9 to 11 parts of benzoic acid, and 38 to 42 parts of petroleum jelly, all parts being by weight, said flux being substantially free of chemical compounds which cause substantial corrosion of the metals to be soldered.

3. A soldering flux consisting essentially of about 30 parts of rosin, about 20 parts of stearic acid, about 10 parts of benzoic acid and about 40 parts of petroleum jelly, all parts being by weight.

WILLIAM H. RINKENBACH.
ARTHUR J. CLEAR.

REFERENCES CITED

The following references are of record in the file of this patent:

UNITED STATES PATENTS

| Number | Name | Date |
|---|---|---|
| 1,859,651 | Bowers | May 24, 1932 |
| 2,095,335 | Kofke | Oct. 12, 1937 |

FOREIGN PATENTS

| Number | Country | Date |
|---|---|---|
| 11,605 | Great Britain | Sept. 17, 1908 |